US009900216B2

(12) United States Patent
Eriksson et al.

(10) Patent No.: US 9,900,216 B2
(45) Date of Patent: Feb. 20, 2018

(54) HANDLING OF DIFFERENT CONTROL CHANNEL CONFIGURATIONS FOR ONE OR MORE WIRELESS DEVICES IN A RADIO NETWORK

(71) Applicant: TELEFONAKTIEBOLAGET L M ERICSSON (PUBL), Stockholm (SE)

(72) Inventors: Erik Eriksson, Linkoping (SE); Xinghua Song, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 111 days.

(21) Appl. No.: 14/401,178

(22) PCT Filed: Aug. 14, 2014

(86) PCT No.: PCT/SE2014/050937
§ 371 (c)(1),
(2) Date: Nov. 14, 2014

(87) PCT Pub. No.: WO2015/112071
PCT Pub. Date: Jul. 30, 2015

(65) Prior Publication Data
US 2015/0381422 A1 Dec. 31, 2015

Related U.S. Application Data

(60) Provisional application No. 61/930,402, filed on Jan. 22, 2014.

(51) Int. Cl.
*H04W 4/00* (2009.01)
*H04L 12/24* (2006.01)
(Continued)

(52) U.S. Cl.
CPC ..... *H04L 41/0853* (2013.01); *H04B 7/15557* (2013.01); *H04B 7/2656* (2013.01); *H04W 24/10* (2013.01); *H04W 72/0446* (2013.01)

(58) Field of Classification Search
CPC . H04B 7/2656; H04B 7/15557; H04W 24/10; H04W 72/0446; H04L 41/0853
See application file for complete search history.

(56) References Cited

U.S. PATENT DOCUMENTS

2001/0040880 A1* 11/2001 Chen ................... H04W 52/265
370/337
2012/0207126 A1 8/2012 Qu et al.
(Continued)

FOREIGN PATENT DOCUMENTS

| EP | 2498419 A2 | 9/2012 |
| EP | 2720504 A1 | 4/2014 |
| WO | 2012161540 A2 | 11/2012 |
| WO | 2012167431 A1 | 12/2012 |
| WO | 2012171465 A1 | 12/2012 |

OTHER PUBLICATIONS

International Search Report dated Aug. 6, 2015, in International Application No. PCT/SE2014/050937, 5 pages.
(Continued)

*Primary Examiner* — Zewdu A Beyen
(74) *Attorney, Agent, or Firm* — Rothwell, Figg, Ernst & Manbeck, P.C.

(57) ABSTRACT

A method (211) for providing wireless devices (120; 122) in radio communication with the network node (110) with different network configurations based on different channel characteristics of the wireless devices. The method includes transmitting (213) a first subframe monitoring information message using a first signaling identifier for addressing one or more wireless devices (120 and/or 122) having a first control channel configuration and transmitting (215) a second subframe monitoring information message using a second signaling identifier for addressing one or more wireless devices (120 and/or 122) having a second control channel configuration. Related methods as well as network nodes (110) and wireless devices (120) that implement these methods are also provided.

53 Claims, 9 Drawing Sheets

(51) Int. Cl.
  *H04B 7/26* (2006.01)
  *H04W 24/10* (2009.01)
  *H04W 72/04* (2009.01)
  *H04B 7/155* (2006.01)

(56) References Cited

U.S. PATENT DOCUMENTS

2013/0150109 A1    6/2013  Takano
2015/0029910 A1*   1/2015  He ......................... H04W 76/02
                                                              370/280

OTHER PUBLICATIONS

Nokia Siemens Networks et al. "On signalling mechanisms to support dynamic TDD UL-DL reconfiguration" 3GPP TSG-RAN WG1 Meeting #73, R1-132297, 2013, 4 pages.

Huawei et al. "CSI enhancements for TDD eIMTA" 3GPP TSG RAN WG1 Meeting #73, R1-132407, 2013, 5 pages.

CATT "Signalling mechanisms for TDD UL-DL reconfiguration" 3GPP TSG RAN WG1 Meeting #72bis, R1-130980, 2013, 4 pages.

3GPP, 3rd Generation Partnership Project; Technical Specification Group Radio Access Network; Evolved Universal Terrestrial Radio Access (E-UTRA); Physical Channels and Modulation (Release 10), 3GPP TS 36.211 V10.3.0, 2011, 103 pages.

CATT, "Further Enhancements to LTE TDD for DL-UL Interference Management and Traffic Adapation—Core Part" 3GPP TSG-RAN Meeting #58, RP-121772, 2012, 6 pages.

CATT, "Further Enhancements to LTE TDD for DL-UL Interference Management and Traffic Adapation—Feature" 3GPP TSG-RAN Meeting #58, RP-121772, 2012, 5 pages.

CATT, "Further Enhancements to LTE TDD for DL-UL Interference Management and Traffic Adapation—Performance Part" 3GPP TSG-RAN Meeting #58, RP-121772, 2012, 5 pages.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 1

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | – | – | – |
| 8 | $24144 \cdot T_s$ | | | – | – | – |

FIG. 2

HANDLING OF DIFFERENT CONTROL CHANNEL CONFIGURATIONS FOR ONE OR MORE WIRELESS DEVICES IN A RADIO NETWORK

CROSS REFERENCE TO RELATED APPLICATION(S)

This application is a 35 U.S.C. § 371 National Phase Entry Application from PCT/SE2014/050937 filed Aug. 14, 2014, which claims priority to U.S. Provisional Application No. 61/930,402, filed Jan. 22, 2014. The disclosures of which are incorporated herein in their entirety by reference.

TECHNICAL FIELD

This disclosure relates generally to handling different control channel configurations for one or more wireless devices in a radio network. Certain embodiments are directed to handling different cell specific reference signal configurations in flexible subframes in an LTE radio network.

BACKGROUND

Two radio frame structures are supported in LTE. The first radio frame structure is applicable to Frequency Division Duplex (FDD), which is a mode of bidirectional communication in which transmission and reception take place at the same time on different carrier frequencies. The second radio frame structure is applicable to Time Division Duplex (TDD), which is a mode of bidirectional communication in which transmissions in each direction take place on the same carrier frequency but in different time slots.

In both frame structure types, a radio frame of 10 ms is divided into two half-frames of 5 ms, with each half-frame consisting of five subframes of length 1 ms. In the TDD frame structure, each subframe is either a downlink subframe, an uplink subframe or a special subframe. LTE TDD supports the various uplink-downlink configurations provided in FIG. 1. With reference to FIG. 1, for each subframe in a radio frame, "D" denotes that the subframe is reserved for downlink transmissions, "U" denotes that the subframe is reserved for uplink transmissions and "S" denotes a special subframe with the three fields. The first field corresponds to a Downlink Pilot TimeSlot (DwPTS), which is a special downlink timeslot occurring in the 2nd subframe (and in some configurations the 7th subframe) of each radio frame. The length of the DwPTS is variable to allow for different DownLink (DL)-UpLink (UL) switching periods to be configured. The second field corresponds to a Guard Period (GP), which is a time period used to prevent overlap between two different signals. The GP can consist of a transmission gap or be filled with a signal whose correct reception is not essential. The GP can be used to prevent overlap between transmission and reception. The third field corresponds to an Uplink Pilot TimeSlot (UpPTS), which is a special uplink timeslot occurring in the 2nd subframe (and in some configurations the 7th subframe) of each radio frame. The UpPTS has a length of 1 or 2 Single Carrier Frequency Division Multiple Access (SC-FDMA) symbols and is used only for transmission of a shortened Random Access Channel (RACH) preamble or Sounding Reference Signal (SRS).

Suitable lengths for DwPTS and UpPTS are identified in FIG. 2 and are subject to the total length of DwPTS, GP, and UpPTS being equal to 1 ms. Each subframe consists of two slots of length 0.5 ms. Uplink-downlink configurations with both 5 ms and 10 ms downlink-to-uplink switch-point periodicity are supported. In case of 5 ms downlink-to-uplink switch-point periodicity, the special subframe exists in both half-frames.

In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

In a TDD cell, a TDD configuration is characterized by both uplink-downlink configuration and special subframe configuration. Therefore the term TDD configuration used hereinafter refers to a combination of uplink-downlink configuration (e.g. one of the configurations in FIG. 1) and a special subframe configuration (e.g. one of the configurations in FIG. 2) configured in a TDD cell. It is appreciated that more TDD configurations may be introduced in future. It is further appreciated that the present application is not intended to be limited to the existing TDD configurations and may be applicable to additional or alternative supported configurations.

Additional information relating to TDD configuration signaling and management in LTE networks is provided in 3GPP RP-121772, "Further Enhancements to LTE TDD for DL-UL Interference Management and Traffic Adaptation," as well as 3GPP TS 36.211, v11.3.0, "Evolved Universal Terrestrial Radio Access (E-UTRA); Physical Channels and Modulation," the disclosures of which are incorporated by reference in their entirety.

SUMMARY

Different users in a radio network cell may benefit from having their respective wireless devices configured with different network configurations depending on their network traffic or other needs. As an example, the different network configurations can correspond to different control channel configurations, such as different cell-specific reference signal (CRS) configurations for facilitating channel estimation and/or data channel mapping.

In some situations, in order to configure a wireless device in the radio network with a different network configuration, the Radio Resource Control (RRC) configuration of one or more other users in the network cell would need to be updated. This can require considerable overhead and can take a non-trivial amount of time, during which one or more wireless devices in the network cell may have reduced network performance.

Some embodiments of the invention described herein are directed to ways of handling different network configurations for different wireless devices in a network cell by configuring different signaling corresponding to different network configurations without disrupting the service of other wireless devices in the network cell.

In some embodiments, a method for providing wireless devices in radio communication with the network node with different network configurations based on different channel characteristics of the wireless devices can include transmitting a first subframe monitoring information message using a first signaling identifier for addressing one or more wireless devices having a first control channel configuration, and transmitting a second subframe monitoring information message using a second signaling identifier for addressing one or more wireless devices having a second control channel configuration. For example, for TDD configuration signalling, subframe monitoring signaling can be used to indicate whether a flexible subframe should be used for uplink or downlink by a wireless device. Control channel configuration can, for example, refer to CRS presence in a flexible subframe. Using such a method, a first set of wireless devices in a radio network cell can be updated without disrupting the service of a second set of wireless devices in the radio network cell.

In some embodiments, the method can further include assigning a wireless device in radio communication with the network node with a first control channel configuration or a second control channel configuration based on one or more channel characteristics associated with the wireless device. The method can also include determining the first subframe monitoring information message based on traffic demands of users of the wireless devices having the first control channel configuration, and determining the second subframe monitoring information message based on traffic demands of users of the wireless devices having the second control channel configuration. In some embodiments, the first subframe monitoring information message identifies a first subframe for monitoring and the second subframe monitoring information identifies a second subframe for monitoring.

In some embodiments, a radio network node is adapted to transmit a first subframe monitoring information message using a first signaling identifier for addressing one or more wireless devices having a first control channel configuration. The radio network node is further adapted to transmit a second subframe monitoring information message using a second signaling identifier for addressing one or more wireless devices having a second control channel configuration.

In some embodiments, a method implemented in a wireless device can include: receiving, from the network node, a first control channel configuration corresponding to the use of a first TDD configuration signaling, the first control channel configuration being based on a first set of one or more potential channel characteristics; receiving, from the network node, a second control channel configuration corresponding to the use of a second signalled TDD configuration signaling, the second control channel configuration being based on a second set of one or more potential channel characteristics; receiving, from the network node, a TDD configuration; and determining, by the wireless device, whether to use the first control channel configuration or the second control channel configuration based on the received TDD configuration.

In some embodiments, a wireless device having a signaling configuration for receiving subframe monitoring signaling from a radio network node is adapted to receive, from the network node, a first subframe monitoring information message associated with a first control channel configuration based on a first set of one or more channel characteristics. The wireless device is further adapted to receive, from the network node, a second subframe monitoring information message associated with a second control channel configuration based on a second set of one or more channel characteristics, and to determine whether to use the first control channel configuration or the second control channel configuration based on the signaling of the subframe monitoring information messages.

Advantages of certain embodiments described herein can include for example: (1) the ability to handle users with different transmission modes, (2) forward compatibility, and/or (3) easing the way for introducing a subframe without CRS at all.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 1 is a table of uplink-downlink configurations supported in LTE TDD.

FIG. 2 is a table illustrating configurations of special subframe (lengths of DwPTS/GP/UpPTS).

DETAILED DESCRIPTION

In some situations, it may be desirable to serve users in a cellular TDD system according to traffic needs by way of providing different uplink/downlink (UL/DL) configurations. For example, a dynamic TDD system with a flexible UL/DL configuration can allow for an adaptation of the amount of UL and DL data to be transmitted by adapting the time slots or subframes allocated to each transmission direction (UL or DL). This can allow for better balancing of a network to the current need of its users.

Figure 3:
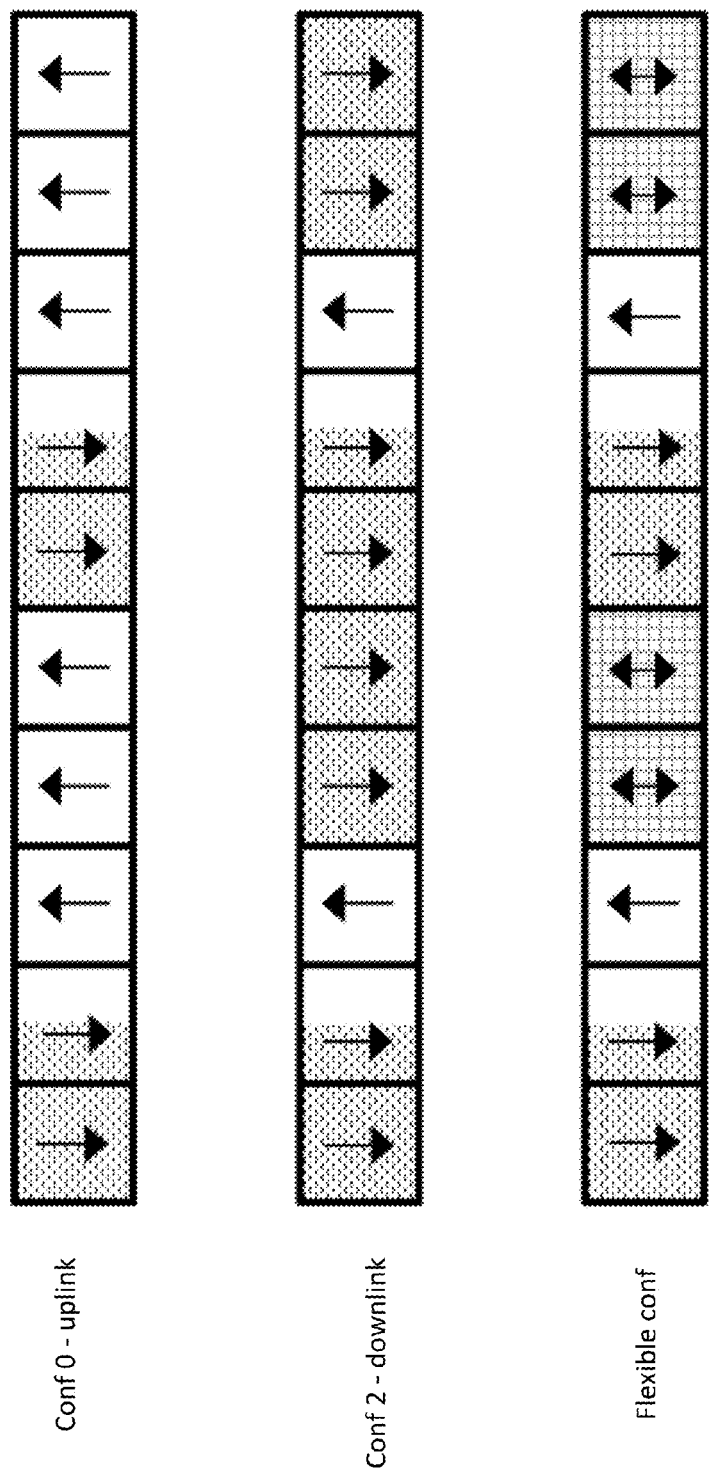
FIG. 3 depicts an example dynamic TDD configuration made from two legacy TDD configurations.

FIG. 3 depicts one non-limiting example of a dynamic TDD configuration made from two legacy TDD configurations (configurations 0 and 2 in FIG. 1), which results in flexible subframes 3, 4, 8, and 9. The term "flexible subframe" as used herein can be defined as a subframe that is an uplink subframe in one TDD configuration and a downlink or special subframe in a second TDD configuration. In some embodiments, a dynamic TDD configuration can, for example, be made from other legacy TDD configurations, such as for example configurations 0 and 5 of FIG. 1, which would result in flexible subframes 3, 4, 7, 8, 9. In some embodiments, the first TDD configuration can, for example, be the configuration used for uplink scheduling and HARQ timing, with the second TDD configuration being the configuration used for downlink HARQ timing.

The term "fixed subframe" can, for example, refer to a subframe whose direction remains the same (i.e. either UL or DL) as indicated in the message containing the TDD configuration (aka UL-DL configuration). For example, subframes with the same link direction in both the configuration used for uplink HARQ timing and the configuration used for downlink HARQ timing. The term "flexible subframe" can, for example, refer to a subframe whose direction can dynamically change between UL and DL over time e.g. between frames. For example, flexible subframes can include subframes with different link directions in the configurations used for uplink and downlink HARQ timing. The term "flexible DL subframe" can, for example, refer to a flexible subframe that is assigned to be a DL subframe by the network node. Likewise, the term "flexible UL subframe" can refer to a flexible subframe that is assigned to be a UL subframe by the network node.

A wireless device can, for example, be informed about the use of flexible subframes by means of signaling from a network node and/or another network entity. A wireless device can be informed about the assumed direction of a flexible subframe by monitoring an explicit signaling message on a Physical Downlink Control Channel (PDCCH). In such an embodiment, the PDCCH can carry a message known as Downlink Control Information (DCI), which includes transmission resource assignments and/or other control information for a wireless device or group of wireless devices. One DCI message, referred to herein as an explicit TDD configuration message, contains multiple TDD configurations applicable to different carriers or transmission point configurations, where each signaled TDD configuration may be referred to with an index in the message. The signaling can, for example, be encoded with a preknown, configured or fixed, radio network temporary identifier (RNTI), which is a wireless device identifier allocated by an eNodeB and is unique within a cell controlled by that eNodeB. The RNTI can for example be in the form of an error detecting code appended to a block of data to be transmitted, such as a cyclic redundancy check (CRC). The wireless device monitors for the message on PDCCH only in pre-known subframes, configured or fixed.

In certain embodiments, network nodes and/or wireless devices can be configured to allow handling of different control channel configurations for one or more wireless devices in a radio network. The control channel configurations can, for example, be different cell-specific reference signal (CRS) configurations that are inserted into a transmitted signal for facilitating channel estimation and; or data channel mapping in an LTE network. In some embodiments, the control channel configurations can additionally or alternatively be channel state information reference signal (CSI-RS) configurations, positioning reference signal (PRS) configurations, and/or multicast-broadcast single-frequency network (MBSFN) configurations. The control channel configurations can, for example, be different in a "flexible subframe."

CRS in one or more OFDM symbols can be used for channel estimation. For example, in some situations, CRS in the fifth OFDM symbol can be used. In some situations, CRS in the fifth, eighth, ninth and twelfth OFDM symbols can be used. In some situations, CRS in the fifth and eighth OFDM symbols can be used. In some situations, a wireless device may be configured to only assume CRS based on a few OFDM symbols, such as for example the first one or two OFDM symbols. It is appreciated that the methods and apparatuses described herein can also apply to flexible subframes in which there is no CRS.

Different users in a cell may benefit from different configurations on CRS-presences in flexible subframes. However, handling of flexible subframes in a dynamic TDD system can then become difficult. For example, as soon as a wireless device enters that needs or wants a different configuration, all of the already configured users would need to update their respective Radio Resource Control (RRC) configurations. This process requires considerable overhead and takes time, during which the flexible subframes cannot be used for downlink.

Some embodiments of the present application are directed to ways of handling different CRS configurations for different users by configuring different signaling for different CRS configurations. The signaling may, for example, be done by using different RNTIs for two different messages and/or by using different configuration indexes within one configuration message and/or by configuring separate or partially overlapping subframes for monitoring the signaling messages. In some embodiments, a user that assumes full CRS listens to one signaling, and if the network wants to use the subframe as a flexible downlink subframe but with reduced CRS it can signal this subframe as uplink for this user. The user with reduced CRS listens to a separate signaling indicating downlink. In embodiments with partial overlapping subframe monitoring the network signal can use the subframe for uplink in an overlapping subframe if it does not intend to use the subframe for downlink, and use separate signaling in the non-overlapping part if it intends to use the subframe for downlink for data or control signaling.

Figure 4:
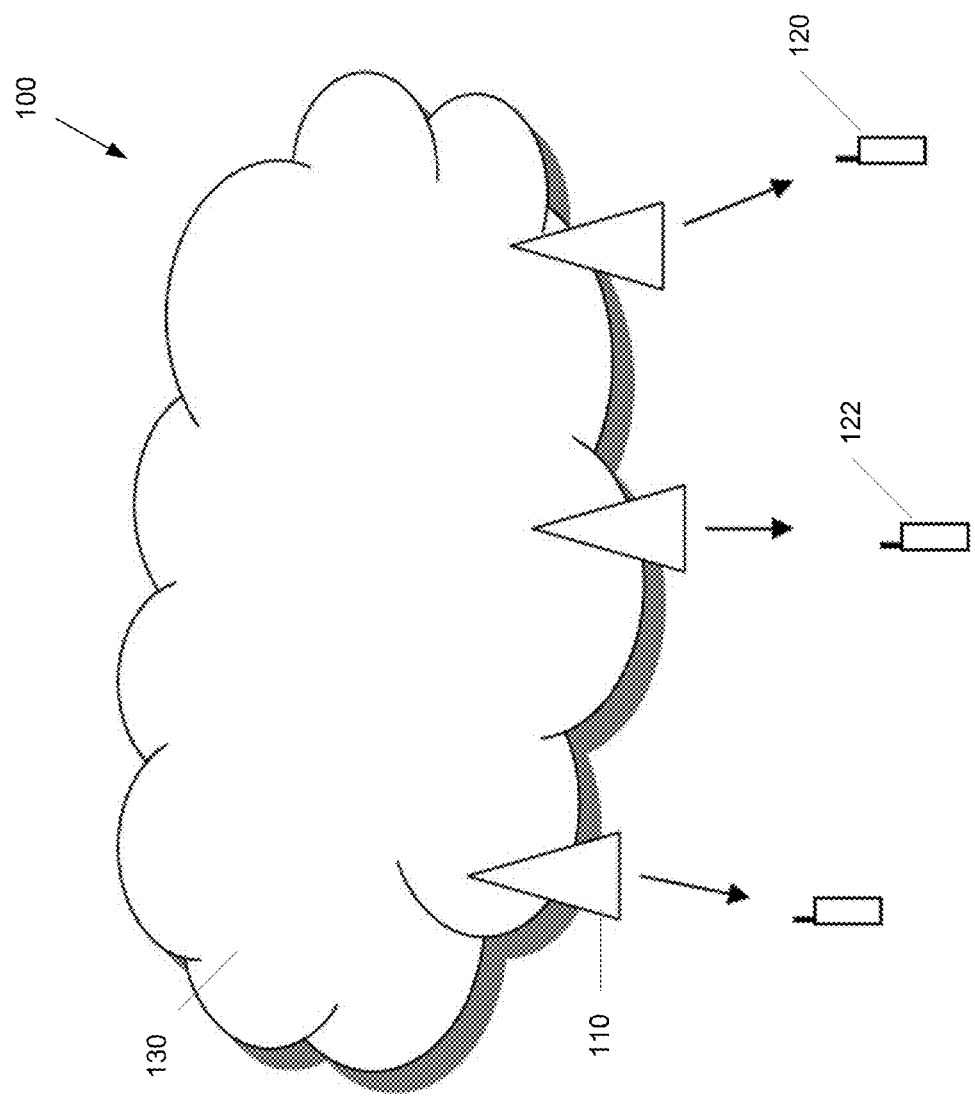
FIG. 4 is a diagram of a wireless communication deployment in accordance with exemplary embodiments.

FIG. 4 illustrates a diagram of a wireless communication deployment 100 in accordance with exemplary embodiments. Deployment 100 includes a radio network node 110 serving one or more wireless devices, such as a first wireless device 120 and a second wireless device 122, within a communications network 130 such as an LTE network or other suitable network. Network node 110 can, for example, be in the form of a base station (macro/micro/pico/femto/home BS), radio base station, base transceiver station, base station controller, network controller, evolved Node B (eNB), Node B, relay node, repeater, access point, radio access point, Remote Radio Unit (RRU) Remote Radio Head (RRH), multi-standard radio (MSR) radio node such as MSR BS nodes in distributed antenna system (DAS), SON node, O&M, OSS, MDT node, Core network node, MME, etc.

Figure 5:
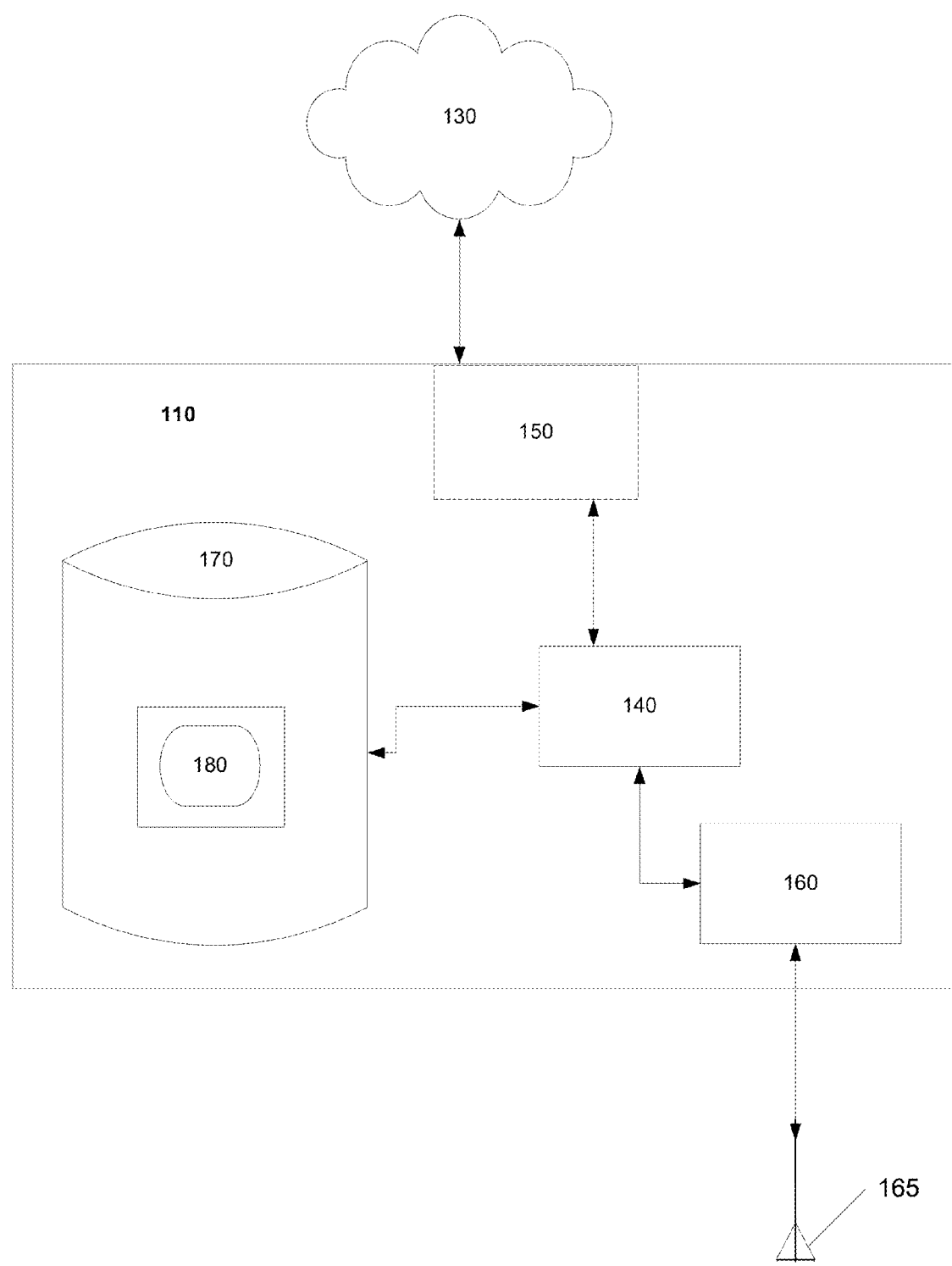
FIG. 5 illustrates a block diagram of a network node.

FIG. 5 illustrates a block diagram of network node 110. Network node 110 can, for example, include a data processing system 140, which may include one or more microprocessors and/or one or more circuits, such as an application specific integrated circuit (ASIC), field-programmable gate arrays (FPGAs), and the like; a network interface 150; a transceiver 160, and a data storage system 170, which may include one or more non-volatile storage devices and/or one or more volatile storage devices (e.g., random access memory (RAM)). According to some embodiments, the data processing system 140 may comprise a control unit used for selection of transmission parameters. In some embodiments, an antenna 165 is coupled to transceiver 160 and is configured to transmit data to and receive data from one or more wireless devices in radio communication with network node 110.

In embodiments where data processing system 140 includes a microprocessor, computer readable program code (CRPC) 180 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 140 to perform one or more steps described herein (e.g., steps described above with reference to the flow charts described herein). In some embodiments, network node 110 is configured to perform steps described herein without the need for code. That is, for example, data processing system 140 may consist merely of one or more ASICs. Hence, it is appreciated that the features of the embodiments described herein may be implemented in hardware and/or software. For example, in some embodiments, the functional components of the base station described above may be implemented by data processing system 140 executing computer instructions, by data processing system 140 operating independent of any computer instructions, or by any suitable combination of hardware and/or software.

Figure 6:
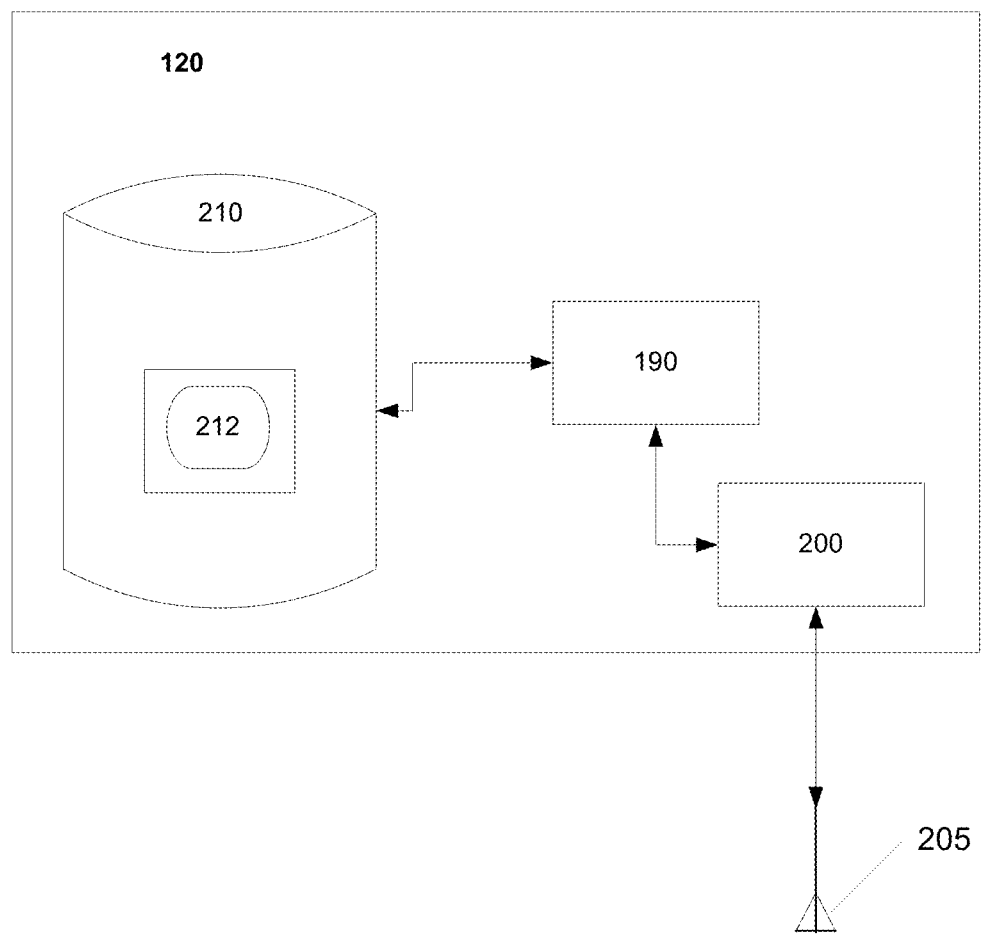
FIG. 6 illustrates a block diagram of wireless device.

FIG. 6 illustrates a block diagram of wireless device 120. Wireless device 120 can, for example, be in the form of a wireless device able to communicate with a radio network node in a cellular or mobile communication system. Some non-limiting examples of a suitable wireless device include a target device, device to device wireless device, machine type wireless device or wireless device capable of machine to machine communication, a sensor equipped with wireless device PDA, iPAD, Tablet, electronic readers, mobile terminals, mobile phones, smart phones, laptop, personal computer, laptop embedded equipment (LEE), laptop mounted equipment (LME), USB dongles, Customer Premises Equipment (CPE), etc.

As shown in FIG. 6, wireless device 120 may include: a data processing system 190, which can, for example, include one or more microprocessors and/or one or more circuits, such as an application specific integrated circuit (ASIC), field-programmable gate arrays (FPGAs), and the like; a transceiver 200 and a data storage system 210, which can for example include one or more non-volatile storage devices and/or one or more volatile storage devices (e.g., random access memory (RAM)). According to some embodiments, data processing system 190 may comprise a control unit used for selection of transmission parameters.

In embodiments, where data processing system 190 includes a microprocessor, computer readable program code (CRPC) 212 may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 190 to perform steps described above (e.g., steps described above with reference to one or more flow charts provided herein). In other embodiments, wireless device 120 is configured to perform steps described herein without the need for code. That is, for example, data processing system 190 may consist merely of one or more ASICs. Hence, the features of the embodiments described herein may be implemented in hardware and/or software. For example, in particular embodiments, the functional components of the base station described above may be implemented by data processing system 190 executing computer instructions, by data processing system 190 operating independent of any computer instructions, or by any suitable combination of hardware and/or software.

Figure 7:
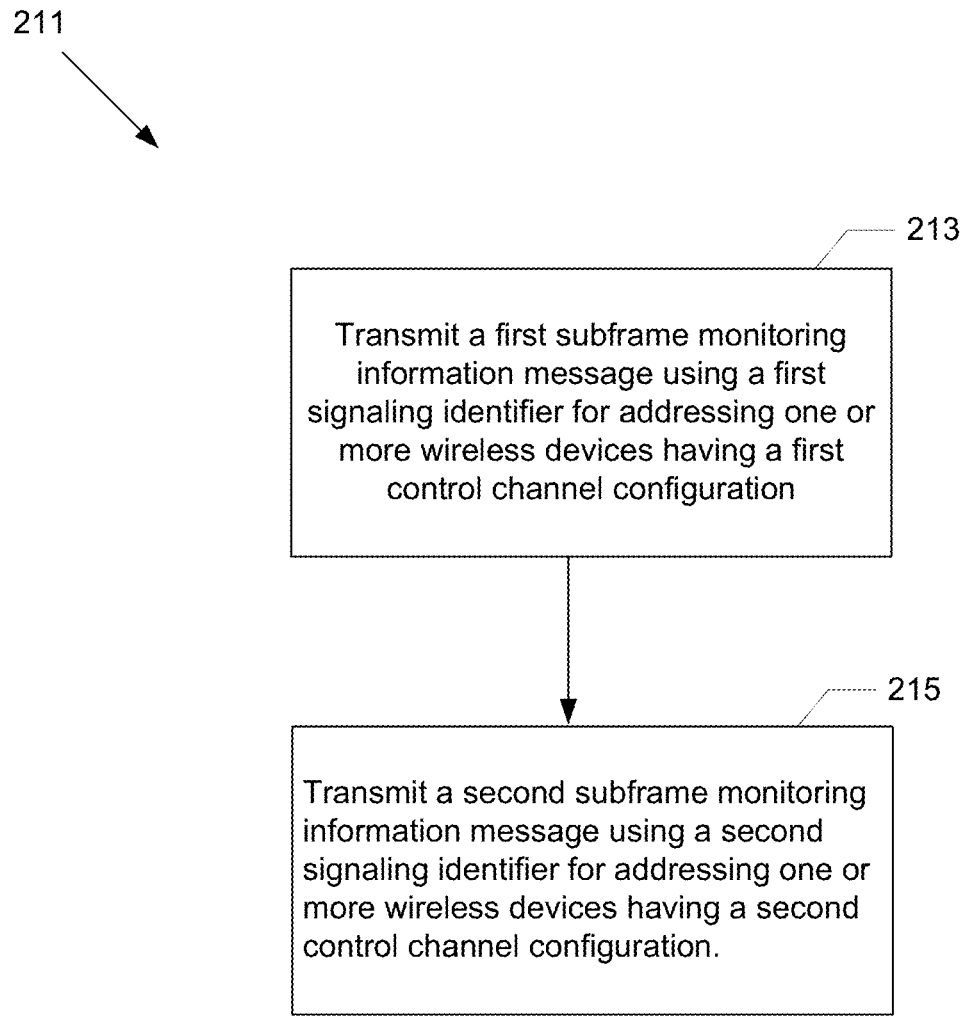
FIG. 7 is a flowchart illustrating a method in accordance with exemplary embodiments.

FIG. 7 is a flowchart for a method 211 implemented in a network node in radio communication with one or more wireless devices involving signaling subframe monitoring information to said one or more wireless devices. Method 211 includes a step 213 of transmitting a first subframe monitoring information message using a first signaling identifier for addressing one or more wireless devices having a first control channel configuration. The term "subframe monitoring information message" as used herein can, for example, refer to instructions or other information regarding how one or more wireless devices should be configured with a certain control channel configuration based on the contents of one or more subframes.

Method 211 further includes a step 215 of transmitting a second subframe monitoring information message using a second signaling identifier for addressing one or more wireless devices having a second control channel configuration.

The first and second signaling identifiers can, for example, be associated with different control channel configurations in an LTE network. In some embodiments, the first and second signaling identifiers can be different RNTIs, different configuration indexes (e.g., indexes to monitor in the explicit signaling, mapping to a first set of bits indicating a TDD configuration), and/or different or partially different subframes for monitoring.

The first and second control channel configurations can, for example, be different CRS configurations for facilitating channel estimation and/or data channel mapping. In some embodiments, the first and second control channel configurations can be different channel state information reference signal (CSI-RS) configurations, different positioning reference signal (PRS) configurations, and/or different multicast-broadcast single-frequency network (MBSFN) configurations.

In some embodiments, a network node will configure a UE with one RNTI for detecting explicit TDD configuration signaling if the UE is configured with one CRS assumption for flexible subframes and a second RNTI if the UE is configured with a second CRS assumption. For the same serving cell there can be multiple UEs with separate RNTIs configured and having separate CRS assumptions.

In some embodiments, a UE configured with a first index to monitor in the explicit signaling, mapping to a first set of bits indicating a TDD configuration if the UE is configured with a first CRS assumption while a second index is configured if the UE is configured with a second CRS assumption. For the same serving cell there can be multiple UEs with separate configuration indexes configured and having separate CRS assumptions.

Method 211 can further include a step of assigning a wireless device in radio communication with the network node with a first control channel configuration or a second control channel configuration based on one or more channel characteristics associated with the wireless device. The one or more channel characteristics can, for example, be associated with wireless device mobility, wireless device capability, and/or a measured signal to interference plus noise ratio (SINR).

Method 211 can further include the step of determining the first subframe monitoring information message based on traffic demands of users of the wireless devices having the first control channel configuration and determining the second subframe monitoring information message based on traffic demands of users of the wireless devices having the second control channel configuration. In some embodiments, the first subframe monitoring information message can identify a first subframe for monitoring and the second subframe monitoring information can identify a second subframe for monitoring.

In some embodiments, a UE is configured with both a first and a second set of CRS assumptions and for each assumption connect it to one signaling alternative. This way a UE can operate dynamically with multiple assumptions on CRS configuration. This would ease co-scheduling of users wanting a low CRS overhead, operating with DMRS based transmission modes, with user needing CRS, operating in CRS based transmission modes. As an example, a UE configured with two CRS assumptions will try to decode the two TDD configurations associated with the two CRS assumptions. If the UE detects one valid TDD configuration indicating that the flexible subframe is DL, the UE shall assume CRS presence configuration associated with this TDD configuration signaling. A UE is not expected to receive two TDD configurations indicating that the flexible subframe is DL at the same time so that only one CRS assumption is applied.

The CRS assumption can, for example, be jointly determined by the TDD configuration signaling and the MBSFN subframe configuration. In some cases, if the flexible subframe is configured as normal DL subframe, the UE will assume full CRS presence if the TDD configuration signaling indicates this flexible subframe as DL. In some cases, if the flexible subframe is configured as an MBSFN subframe, the UE will assume CRS presence only in the MBSFN region if the TDD configuration signaling indicates this flexible subframe as DL.

Figure 8:
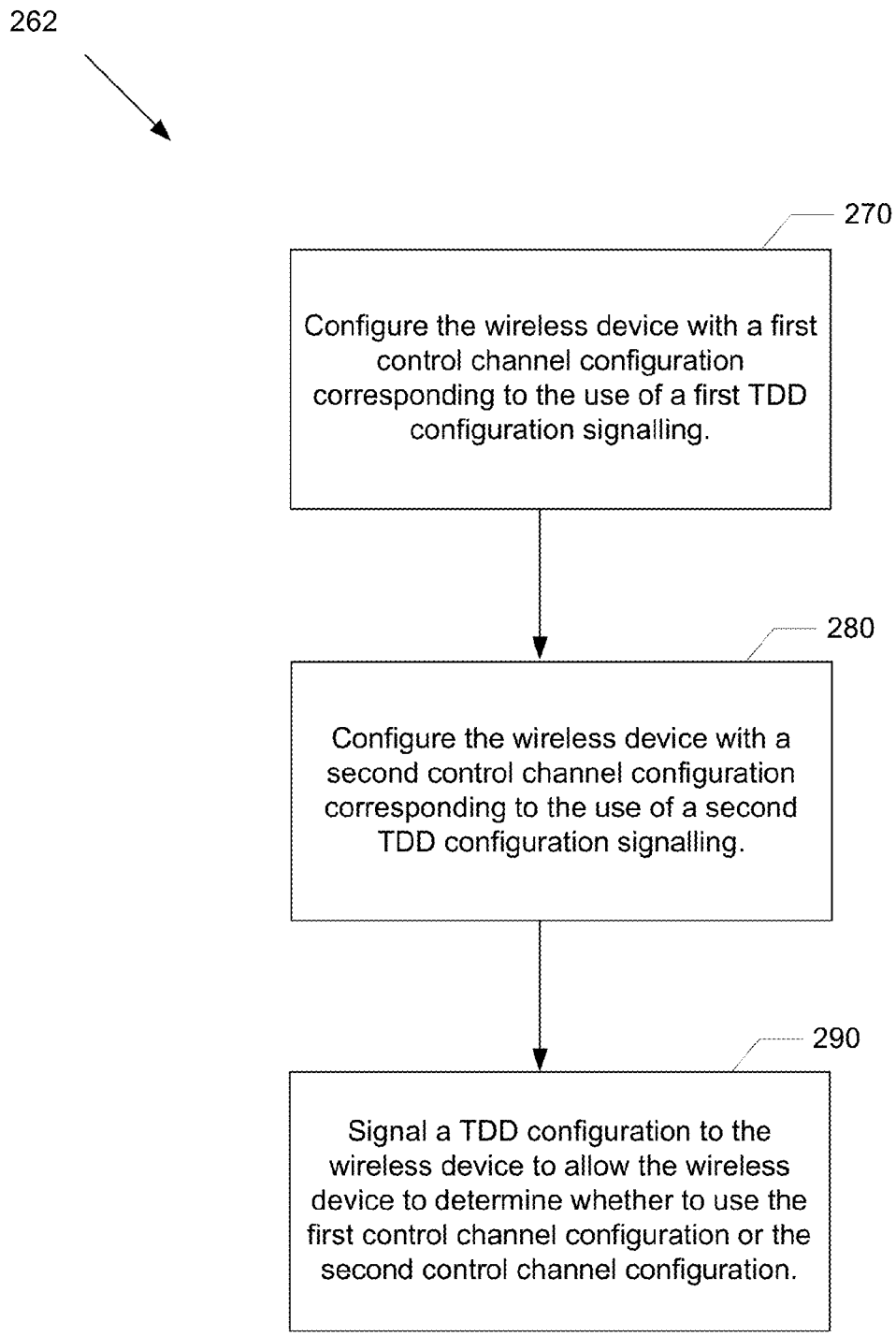
FIG. 8 is a flowchart illustrating a method in accordance with exemplary embodiments.

FIG. 8 is a flowchart for a method 262 implemented in a radio network node, such as network node 110, for communicating with a wireless device having a signaling configuration for receiving subframe monitoring signaling from the network node.

Method 262 includes a step 270 of configuring the wireless device with a first control channel configuration corresponding to the use of a first TDD configuration signaling. In this embodiment, the first TDD configuration signaling is a configuration signalled dynamically using a first subframe monitoring signaling. The first control channel configuration being based on a first set of one or more potential channel characteristics. Method 262 includes a step 280 of configuring the wireless device with a second control channel configuration corresponding to the use of a second TDD configuration signaling by the wireless device. In this embodiment, the second TDD configuration signaling is a configuration signaled dynamically using a second subframe monitoring signaling. The second control channel configuration is based on a second set of one or more potential channel characteristics.

Method 262 includes step 290 of signaling a TDD configuration to the wireless device to allow the wireless device to determine whether to use the first control channel configuration or the second control channel configuration.

Figure 9:
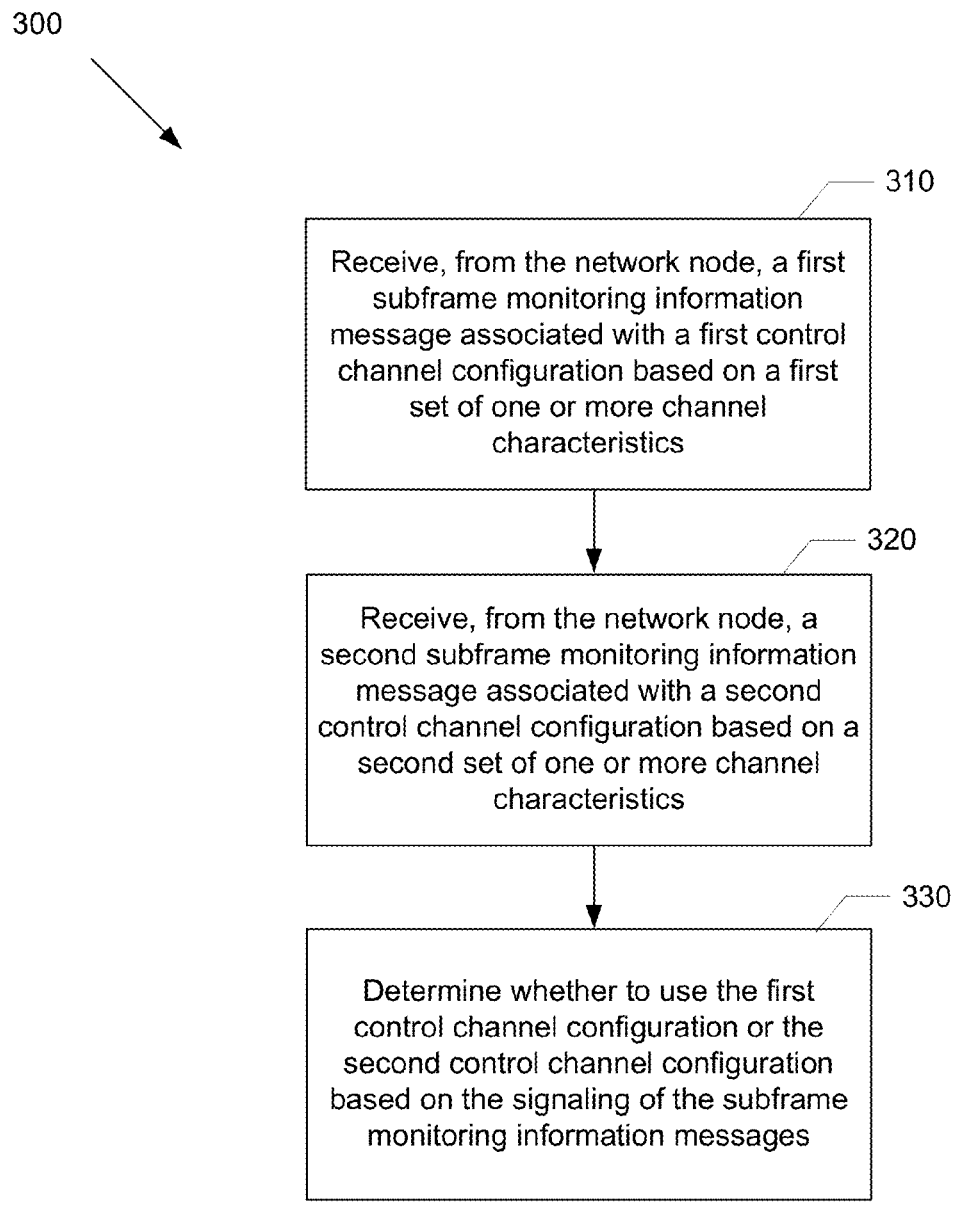
FIG. 9 is a flowchart illustrating a method in accordance with exemplary embodiments.

FIG. 9 is a flowchart for a method 300 implemented in a wireless device, such as wireless device 120, having a signaling configuration for receiving subframe monitoring signaling from a radio network node.

Method 300 includes a step 310 of receiving, from the network node, a first subframe monitoring information message associated with a first control channel configuration. In this embodiment, the first control channel configuration is based on a first set of one or more channel characteristics. Method 300 includes a step 320 of receiving, from the network node, a second subframe monitoring information message associated with a second control channel configuration. In this embodiment, the second control channel configuration is based on a second set of one or more channel characteristics.

Method 300 includes a step 330 of determining whether to use the first control channel configuration or the second control channel configuration based on the signaling of the subframe monitoring information messages.

In some embodiments, the suitable control channel configuration, such as a suitable CRS configuration, can be jointly determined by TDD configuration signaling and MBSFN subframe configuration. As but one example, the wireless device may be configured such that if the flexible subframe is configured as normal DL subframe, the wireless device will assume full CRS presence if the TDD configuration signaling indicates this flexible subframe as DL. As another example, if the flexible subframe is configured as an MBSFN subframe, the wireless device will assume CRS presence only in the MBSFN region if the TDD configuration signaling indicates this flexible subframe as DL. In some embodiments, a network node is configured so as not to transmit two TDD configurations, using separate signaling configuration associated with different control channel configurations, indicating that the flexible subframe is DL at the same time, so that only one CRS configuration is applied.

In a network node deciding on the uplink/downlink configuration to signal in the explicit signaling DCI a method is in one embodiment implemented comparing the uplink vs. downlink need of users with different CRS-configurations separately and deciding is a subframe should be downlink and with what CRS configuration, and signals this to the wireless device. In some embodiments, if some wireless devices support receiving multiple signaling for different configurations the most limiting users can be considered in a first stage. In some embodiments, a second configuration can be used only if none of the users not supporting multiple configurations wants to be scheduled by the network.

In some embodiments, two different signaling is only used during a reconfiguration stage, where all affected wireless devices are reconfigured with a second signaling and a second configuration. In such an embodiment, when no user monitors a specific configuration, the corresponding configuration is no longer signaled. The same signaling may later be reused for the same or a different CRS configuration.

Abbreviations

3GPP: 3rd Generation Partnership Project
BS: Base Station
CID: Cell Identity
CRS: Cell-specific Reference Signal
DL: Downlink
ID: Identity
LTE: Long Term Evolution
OFDM: Orthogonal Frequency Division Multiplexing
PDCCH: Physical Downlink Control Channel
PDSCH: Physical Downlink Shared Channel
PRS: Positioning Reference Signal
PSS: Primary Synchronization Signal
RAT: Radio Access Technology
RE: Resource Element
RB: Resource Block
RRM: Radio Resource Management
UE: User Equipment
UL: Uplink Although terminology from 3GPP LTE has been used in this disclosure to describe certain embodiments, it is appreciated that one of ordinary skill in the art would understand this as not limiting the scope of the present embodiments to only the aforementioned system. Other wireless systems, such as HSPA, LTE-A, WiMax, UMB and GSM, may also benefit from exploiting the ideas covered within this disclosure. Furthermore, the terminology such as network node and wireless device are non-limiting and are not intended to necessarily imply a certain hierarchical relation between the two.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc., may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible, non-transitory, computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method implemented in a network node for providing wireless devices in radio communication with the network node with different network configurations based on different channel characteristics of the wireless devices, the method comprising:

transmitting, by the network node, a first subframe monitoring information message using a first signaling identifier for addressing one or more wireless devices having a first control channel configuration;

transmitting, by the network node, a second subframe monitoring information message using a second signaling identifier for addressing one or more wireless devices having a second control channel configuration, and assigning, by the network node, a wireless device in radio communication with the network node with a first control channel configuration or a second control channel configuration based on one or more channel characteristics associated with the wireless device, wherein the first control channel configuration comprises first transmission resource assignments for the wireless device for communicating with the network node over a communication channel, the first resource assignments for the first control channel configuration including a first direction assignment for a first subframe and a second direction assignment for a second subframe, the first and second direction assignments each being one of an uplink direction and a downlink direction;

wherein the second control channel configuration comprises second transmission resource assignments for the wireless device for communicating with the network node over the communication channel, the second resource assignments for the second control channel configuration including a third direction assignment for the first subframe and a fourth direction assignment for the second subframe, wherein the third direction assignment is the same as the first direction assignment, and the fourth direction assignment is different than the second direction assignment.

2. The method according to claim 1, further comprising:
determining the first subframe monitoring information message based on traffic demands of users of the wireless devices having the first control channel configuration; and
determining the second subframe monitoring information message based on traffic demands of users of the wireless devices having the second control channel configuration.

3. The method according to claim 1, wherein the first subframe monitoring information message identifies a first subframe for monitoring and the second subframe monitoring information identifies a second subframe for monitoring.

4. The method according to claim 1, wherein the first and second signaling identifiers are different radio network temporary identifiers (RNTIs).

5. The method according to claim 1, wherein the first and second signaling identifiers are different configuration indexes.

6. The method according to claim 1, wherein the first and second signaling identifiers are different subframe configurations.

7. The method according to claim 1, wherein the first and second signaling identifiers are associated with different transmission methods for a signalling of a Time Division Duplex (TDD) configuration.

8. The method according to claim 1, wherein the first and second control channel configurations are different cell-specific reference signal (CRS) configurations for facilitating channel estimation and/or data channel mapping.

9. The method according to claim 1, wherein the first and second control channel configurations are different channel state information reference signal (CSI-RS) configurations.

10. The method according to claim 1, wherein the first and second control channel configurations are different positioning reference signal (PRS) configurations.

11. The method according to claim 1, wherein the first and second control channel configurations are different multicast-broadcast single-frequency network (MBSFN) configurations.

12. The method according to claim 1, wherein the one or more channel characteristics are associated with wireless device mobility.

13. The method according to claim 1, wherein the one or more channel characteristics are associated with wireless device capability.

14. The method according to claim 1, wherein the one or more channel characteristics are associated with a measured signal to interference plus noise ratio (SINR).

15. The method according to claim 1, wherein the radio network node is a base station (BS).

16. The method according to claim 15, wherein the base station (BS) is one of an eNodeB (eNB) BS, a Node B BS, a macrocell BS, a microcell BS, a picocell BS, and a femtocell BS.

17. The method according to claim 1, wherein the radio network node is one of a relay node, repeater, access point, radio access point, Remote Radio Unit (RRU), Remote Radio Head (RRH), multi-standard radio (MSR) base station node, self-optimizing/organizing network (SON) node, operation & maintenance (O&M) node, open storage server (OSS) node, MDT node, core network node, and mobility management entity (MME).

18. The method according to claim 1, wherein at least one of the first wireless device and second wireless device is at least one of a device to device wireless device, a wireless device configured for machine to machine communication, a sensor equipped wireless device, a tablet device, an electronic reader, a mobile terminal, a mobile phone, a laptop computer, a personal computer, a laptop embedded equipment (LEE), a laptop mounted equipment (LME), a USB dongle, and a Customer Premises Equipment (CPE).

19. The method according to claim 1, wherein the method is performed in response to receiving information that the second wireless device has entered radio communication with the network node.

20. A radio network node adapted to:
transmit a first subframe monitoring information message using a first signaling identifier for addressing one or more wireless devices having a first control channel configuration;
transmit a second subframe monitoring information message using a second signaling identifier for addressing one or more wireless devices having a second control channel configuration, and
assign a wireless device in radio communication with the network node with a first control channel configuration or a second control channel configuration based on one or more channel characteristics associated with the wireless device,
wherein the first control channel configuration comprises first transmission resource assignments for the wireless device for communicating with the network node over a communication channel,
the first resource assignments for the first control channel configuration including a first direction assignment for a first subframe and a second direction assignment for a second subframe, the first and second direction assignments each being one of an uplink direction and a downlink direction;
wherein the second control channel configuration comprises second transmission resource assignments for the wireless device for communicating with the network node over the communication channel,
the second resource assignments for the second control channel configuration including a third direction assignment for the first subframe and a fourth direction assignment for the second subframe, wherein the third direction assignment is the same as the first direction assignment, and the fourth direction assignment is different than the second direction assignment.

21. The radio network node according to claim 20 further adapted to:

determine the first subframe monitoring information message based on traffic demands of users of the wireless devices having the first control channel configuration; and determine the second subframe monitoring information message based on traffic demands of users of the wireless devices having the second control channel configuration.

22. The radio network node according to claim 20, wherein the first subframe monitoring information message identifies a first subframe for monitoring and the second subframe monitoring information identifies a second subframe for monitoring.

23. The radio network node according to claim 20, wherein the first and second signaling identifiers are different radio network temporary identifiers (RNTIs).

24. The radio network node according to claim 20, wherein the first and second signaling identifiers are different configuration indexes.

25. The radio network node according to claim 20, wherein the first and second signaling identifiers are different subframe configurations.

26. The radio network node according to claim 20, wherein the first and second signaling identifiers are associated with different transmission methods for a signaling of a Time Division Duplex (TDD) configuration.

27. The radio network node according to claim 20, wherein the first and second control channel configurations are different cell-specific reference signal (CRS) configurations for facilitating channel estimation and/or data channel mapping.

28. The radio network node according to claim 20, wherein the first and second control channel configurations are different channel state information reference signal (CSI-RS) configurations.

29. The radio network node according to claim 20, wherein the first and second control channel configurations are different positioning reference signal (PRS) configurations.

30. The radio network node according to claim 20, wherein the first and second control channel configurations are different multicast-broadcast single-frequency network (MBSFN) configurations.

31. The radio network node according to claim 20, wherein the one or more channel characteristics are associated with wireless device mobility.

32. The radio network node according to claim 20, wherein the one or more channel characteristics are associated with wireless device capability.

33. The radio network node according to claim 20, wherein the one or more channel characteristics are associated with a measured signal to interference plus noise ratio (SINK).

34. The radio network node according to claim 20, wherein the radio network node is a base station (BS).

35. The radio network node according to claim 20, wherein the base station (BS) is one of an eNodeB (eNB) BS, a Node B BS, a macrocell BS, a microcell BS, a picocell BS, and a femtocell BS.

36. The radio network node according to claim 20, wherein the radio network node is one of a relay node, repeater, access point, radio access point, Remote Radio Unit (RRU), Remote Radio Head (RRH), multi-standard radio (MSR) base station node, self-optimizing/organizing network (SON) node, operation & maintenance (O&M) node, open storage server (OSS) node, MDT node, core network node, and mobility management entity (MME).

37. The radio network node according to claim 20, wherein the radio network node is further adapted to transmit in response to receiving information that the second wireless device has entered radio communication with the network node.

38. A method implemented in a wireless device having a signaling configuration for receiving subframe monitoring signaling from a radio network node, the method comprising:

receiving, from the network node, a first subframe monitoring information message associated with a first control channel configuration based on a first set of one or more channel characteristics;

receiving, from the network node, a second subframe monitoring information message associated with a second control channel configuration based on a second set of one or more channel characteristics;

determining to use a control channel configuration selected from the first control channel configuration or the second control channel configuration based on the signaling of the subframe monitoring information messages; and using the determined control channel configuration, wherein the first control channel configuration comprises first transmission resource assignments for the wireless device for communicating with the network node over a communication channel, the first resource assignments for the first control channel configuration including a first direction assignment for a first subframe and a second direction assignment for a second subframe, the first and second direction assignments each being one of an uplink direction and a downlink direction;

wherein the second control channel configuration comprises second transmission resource assignments for the wireless device for communicating with the network node over the communication channel, the second resource assignments for the second control channel configuration including a third direction assignment for the first subframe and a fourth direction assignment for the second subframe, wherein the third direction assignment is the same as the first direction assignment, and the fourth direction assignment is different than the second direction assignment.

39. The method according to claim 38, wherein the first and second control channel configurations are different cell-specific reference signal (CRS) configurations for facilitating one or more of channel estimation and data channel mapping.

40. The method according to claim 38, wherein the first and second control channel configurations are different channel state information reference signal (CSI-RS) configurations.

41. The method according to claim 38, wherein the first and second control channel configurations are different positioning reference signal (PRS) configurations.

42. The method according to claim 38, wherein the first and second control channel configurations are different multicast-broadcast single-frequency network (MBSFN) configurations.

43. The method according to claim 38, wherein the one or more channel characteristics are associated with wireless device mobility.

44. The method according to claim 38, wherein the one or more channel characteristics are associated with wireless device capability.

45. The method according to claim 38, wherein the one or more channel characteristics are associated with a measured signal to interference plus noise ratio (SINR).

46. A wireless device having a signaling configuration for receiving subframe monitoring signaling from a radio network node, the wireless device adapted to:
- receive, from the network node, a first subframe monitoring information message associated with a first control channel configuration based on a first set of one or more channel characteristics;
- receive, from the network node, a second subframe monitoring information message associated with a second control channel configuration based on a second set of one or more channel characteristics;
- determine to use a control channel configuration selected from the first control channel configuration or the second control channel configuration based on the signaling of the subframe monitoring information messages; and
- use the determined control channel configuration,
- wherein the first control channel configuration comprises first transmission resource assignments for the wireless device for communicating with the network node over a communication channel,
- the first resource assignments for the first control channel configuration including a first direction assignment for a first subframe and a second direction assignment for a second subframe, the first and second direction assignments each being one of an uplink direction and a downlink direction;
- wherein the second control channel configuration comprises second transmission resource assignments for the wireless device for communicating with the network node over the communication channel,
- the second resource assignments for the second control channel configuration including a third direction assignment for the first subframe and a fourth direction assignment for the second subframe, wherein the third direction assignment is the same as the first direction assignment, and the fourth direction assignment is different than the second direction assignment.

47. The wireless device according to claim 45, wherein the first and second control channel configurations are different cell-specific reference signal (CRS) configurations for facilitating one or more of channel estimation and data channel mapping.

48. The wireless device according to claim 45, wherein the first and second control channel configurations are different channel state information reference signal (CSI-RS) configurations.

49. The wireless device according to claim 45, wherein the first and second control channel configurations are different positioning reference signal (PRS) configurations.

50. The wireless device according to claim 45, wherein the first and second control channel configurations are different multicast-broadcast single-frequency network (MBSFN) configurations.

51. The wireless device according to claim 45, wherein the one or more channel characteristics are associated with wireless device mobility.

52. The wireless device according to claim 45, wherein the one or more channel characteristics are associated with wireless device capability.

53. The wireless device according to claim 45, wherein the one or more channel characteristics are associated with a measured signal to interference plus noise ratio (SINR).

* * * * *